United States Patent [19]

Sato et al.

[11] Patent Number: 5,734,855
[45] Date of Patent: Mar. 31, 1998

[54] PROCESSOR WITH PIPELINE PROCESSING FUNCTION HAVING READ BUFFER REGISTER AND LATCH FOR STORING REGISTER INFORMATION WHERE THE RESULT OF EXTERNAL ACCESS TYPE INSTRUCTION IS STORED

[75] Inventors: Fumiki Sato; Kouichi Fujita, both of Tokyo, Japan

[73] Assignee: Mitsubishi Denki Kabushiki Kaisha, Tokyo, Japan

[21] Appl. No.: 588,168

[22] Filed: Jan. 18, 1996

[30] Foreign Application Priority Data

Jan. 25, 1995 [JP] Japan ................................ 7-010112

[51] Int. Cl.[6] .................................................. G06F 9/38
[52] U.S. Cl. ........................... 395/395; 395/872; 395/427; 395/481; 395/496
[58] Field of Search .................. 365/230.08, 230.05; 395/800, 377, 392, 395, 551, 552, 872, 427, 481, 496

[56] References Cited

U.S. PATENT DOCUMENTS

| 3,949,379 | 4/1976 | Ball ................................ 395/395 |
| 4,635,194 | 1/1987 | Burger et al. ..................... 395/381 |
| 4,639,866 | 1/1987 | Loo ................................. 395/496 |
| 5,257,388 | 10/1993 | Hayamizu ........................ 395/800 |
| 5,276,822 | 1/1994 | Maekawa et al. ................. 395/394 |
| 5,430,888 | 7/1995 | Witek et al. ..................... 395/800 |
| 5,473,574 | 12/1995 | Clemen et al. ................ 365/230.05 |
| 5,475,855 | 12/1995 | Uesugi ............................. 395/800 |
| 5,500,830 | 3/1996 | Okabayashi ................. 365/230.08 |
| 5,515,521 | 5/1996 | Whitted, III et al. ............. 395/403 |

*Primary Examiner*—Meng-Ai T. An
*Attorney, Agent, or Firm*—Lowe, Price, LeBlanc & Becker

[57] ABSTRACT

A data processor which uses a pipeline function to process data reads from an external device which may take two cycles or more. The data processor includes a read buffer register (13) which stores data having been read from an external device by the processing of an external access type instruction word. A latch (16) stores information specifying a register in a register file (4) into which the result of the external access type instruction is stored. A controlling device stores data read from the external device temporarily into the read buffer register (13), and stores the data into a register specified by data stored in the data latch (16).

4 Claims, 10 Drawing Sheets

FIG. 2
PRIOR ART

| CYCLE | T0 | T1 | T2 | T3 | T4 |
|---|---|---|---|---|---|
| STAGE FETCH | FETCH INSTRUC-TION WORD | | | | |
| DECODE | | DECODE (ADD Rx,Ry,Rz) READ Rx READ Ry | | | |
| EXECU-TION | | | Rx→X BUS Ry→Y BUS X BUS + Y BUS →T | | |
| MEMORY REF. | | | | T→T' | |
| WRITE | | | | | T'→Z BUS→Rz |

FIG. 3
PRIOR ART

| CYCLE | | T0 | T1 | T2 | T3 | T4 |
|---|---|---|---|---|---|---|
| STAGE | FETCH | FETCH INSTRUC-TION WORD | | | | |
| | DECODE | | DECODE (Rx,off,Rz) READ Rx | | | |
| | EXECU-TION | | | Rx→X BUS off→Y BUS X BUS + Y BUS →AD | | |
| | MEMORY REF. | | | | M[AD]→BIU | |
| | WRITE | | | | | BIU→Z BUS→Rz |

FIG. 4

```
      31                          15 14  10 9    5 4    0
100 ─┤    (ADD)           │ (Ry) │ (Rx) │ (Rz) │

31   26 25                      10 9    5 4    0
101 ─┤(RD)│      (off)              │ (Rx) │ (Rz) │
```

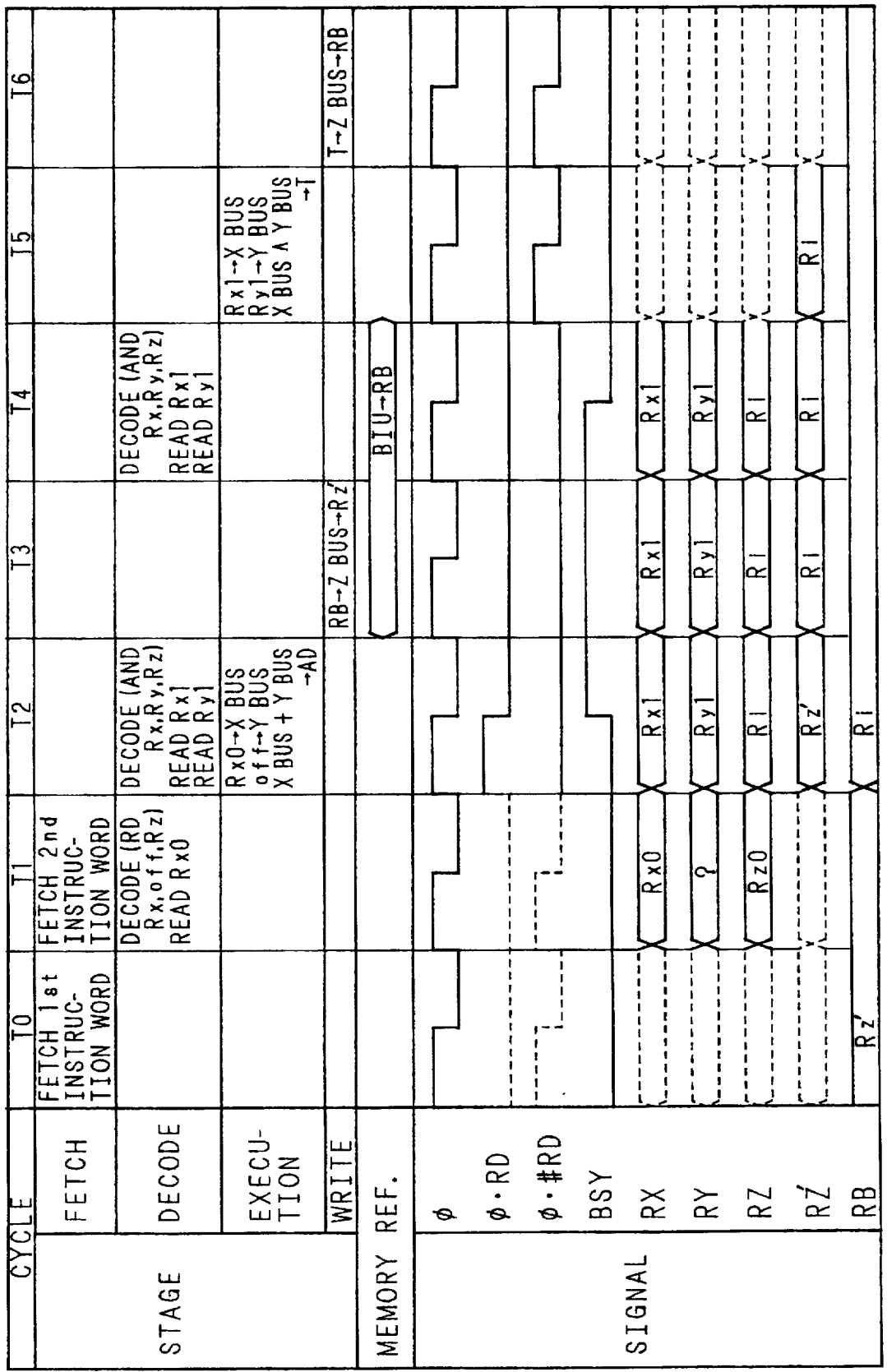

PROCESSOR WITH PIPELINE PROCESSING FUNCTION HAVING READ BUFFER REGISTER AND LATCH FOR STORING REGISTER INFORMATION WHERE THE RESULT OF EXTERNAL ACCESS TYPE INSTRUCTION IS STORED

BACKGROUND OF THE INVENTION

1. Field of the Invention

The present invention relates to a data processor having a pipeline processing function which executes processing of an instruction word by dividing it into a plurality of stages.

2. Description of the Related Art

In a recent data processor, for improving a data processing speed, it has a so-called pipeline processing function in many cases. FIG. 1 is a block diagram showing a configuration example of a data path of such a conventional data processor having the pipeline processing function, and FIG. 2 and FIG. 3 are schematic views showing a pipeline configuration and a processing flow in respective stages, in case of executing processing of the instruction word in a 5-stage pipeline. In FIG. 2 and FIG. 3, respective stages of the pipeline are shown in a vertical direction, and cycles designated by reference characters T0, T1, T2, T3, and T4 are shown in a horizontal direction.

A configuration of the pipeline stages shown in FIG. 2 and FIG. 3 is as follows. A first stage is a fetch stage, where an instruction word is fetched from an instruction word cache. A second stage is a decode stage, where the fetched instruction word is decoded. A third stage is an execution stage, where an operation specified by the instruction word is executed in an arithmetic and logic unit. A fourth stage is a memory reference stage, where memory reference or access to an external memory is made according to an address obtained as the operation result in the execution stage which is the previous stage. A fifth stage is a write stage, where the operation result obtained in the execution stage or data read by accessing to the external memory in the memory reference stage is written into a register.

In FIG. 1, numeral 1 designates a first data bus in a data path (hereinafter, referred to as an X bus). Numeral 2 designates a second data bus in the data path (hereinafter, referred to as a Y bus). Numeral 3 designates a third data bus in the data path (hereinafter, referred to as a Z bus).

Numeral 4 designates a register file composed of a plurality of registers. The register file 4 has output paths to the X bus 1 and Y bus 2, and an input path from the Z bus 3. In the decode stage, the content of the register corresponding to a field value specifying a source register in the instruction word is read from the register file 4 and outputted to both or one of the X bus 1 and Y bus 2. Also, in the decode stage, data is written into the register corresponding to a field value specifying a destination register from the Z bus 3 in the write stage.

Numeral 5 designates an offset register having an output path to the Y bus 2. When, in the decode stage, a field off specifying offset data of the instruction word is valid, the content of the offset register 5 is outputted to the Y bus 2 in the execution stage.

Numeral 6 designates an arithmetic and logic unit (ALU) having input paths from the X bus 1 and Y bus 2. The arithmetic and logic unit 6 inputs data of the X bus 1 and data of the Y bus 2 in the execution stage, and executes arithmetic operation or logical operation specified by the instruction word to the two data.

Numeral 7 designates a temporary register and numeral 8 designates an address register, which are both connected to an output of the arithmetic and logic unit 6. When a result obtained by the arithmetic and logic unit 6 in the execution stage is the operation result, the temporary register 7 holds the operation result temporarily and outputs it to the Z bus 3 in the write stage. The temporary register 7 is a 2-stage register of a first-in first-out (FIFO) type, and outputs the operation result obtained in the execution stage to the Z bus 3 in the next write stage. When a result obtained by the arithmetic and logic unit 6 in the execution stage is an address to an external memory 9, the address register 8 holds the result.

Numeral 10 designates a bus interface circuit having input paths from the address register 8 and the Z bus 3, and output paths to the X bus 1, Y bus 2 and Z bus 3. The bus interface circuit 10 is connected to the external memory 9 through an address bus 11, a data bus 12 and a control signal line (not shown). Thus, when an address is given from the address register 8, the bus interface circuit 10 gives it to the external memory 9 via the address bus 11, thereby accessing to the external memory 9 to read out data corresponding to the address via the data bus 12.

In the following, with reference to a timing chart shown in FIG. 2, procedures of pipeline processing of the instruction in the conventional data processor is described specifically. Hereupon, the pipeline processing procedures of (ADD Rx, Ry, Rz) as an example of an instruction word is described. The instruction word (ADD Rx, Ry, Rz) is the instruction word for adding (ADD) the content of a source register specified by Rx and the content of a source register specified by Ry, and writing the addition result into the destination register specified by Rz, and memory reference or accessing to the external memory is not performed.

In the cycle T0, the instruction word (ADD Rx, Ry, Rz) is fetched from the instruction word cache in the fetch stage. In a cycle T1, the instruction word (ADD Rx, Ry, Rz) is decoded by a decoder (not shown) in the decode stage. At this time, the content of the source register specified by Rx, Ry of the instruction word is also read from the register file 4 at the same time (read Rx, read Ry).

In the cycle T2, the content of the source register read from the register file 4 in the cycle T1 is outputted to the X bus 1 and Y bus 2 in the execution stage (Rx→X bus, Ry→Y bus). They are added to each other in the arithmetic and logic unit 6 and the addition result is held in the temporary register 8 (X bus+Y bus→T). In a cycle T3, no processing is performed because the memory reference is not performed by the instruction word in the memory reference stage, and the addition result in the cycle T2 is held intact in the temporary register 7 (T→T').

In a cycle T4, the addition result held in the temporary register 7 in the cycle T3 is written into the destination register specified by Rz in the register file 4 via the Z bus 3, in the write stage (T'→Z bus→Rz). Thereby, prosessings of the instruction word (ADD Rx, Ry, Rz) are finished.

Though the above-mentioned instruction word (ADD Rx, Ry, Rz) is a type not performing the memory reference, as an example of a type performing memory reference, pipeline processing procedures of the instruction word (RD Rx, off, Rz) is described with reference to a schematic view of FIG. 3.

The instruction word (RD Rx, off, Rz) adds the contents of the source register specified by Rx and offset data specified by off, performs memory reference reading data from the memory with the result as an address, that is, accessing to the external memory, and writes the data into the destination register specified by Rz.

In a cycle T0, the instruction word (RD Rx, off, Rz) is fetched from the instruction word cache in the fetch stage. In a cycle T1, the instruction word (RD Rx, off, Rz) is decoded by a decoder, not shown, in the decode stage. At this time, the content of the source register specified by Rx of the instruction word is also read from the register file 4 (read Rx).

In a cycle T2, the content of the source register read out in the cycle T1 is outputted to the X bus 1 (Rx→X bus), and offset data specified by off is outputted to the Y bus 2 from the offset register 5 (off→Y bus) in the execution stage. They are added by the arithmetic and logic unit 6 and the addition result is held in the address register 8 (X bus+Y bus→AD).

In a cycle T3, the bus interface circuit 10 reads data from the external memory 9 with the addition result obtained in the cycle T2 as an address (M[AD]→BIU) in the memory reference stage. In a cycle T4, the data read from the external memory 9 in the cycle T3 is written into a register specified by Rz in the register file 4 via the Z bus 3 in the write stage (BIU→Z bus→Rz). Thereby, processings of the instruction word (RD Rx, off, Rz) are finished.

Thus, basically, the pipeline processing is executed in the same procedure for both the instruction word of a type not performing memory reference (external access), for example, the aforementioned instruction word (ADD Rx, Ry, Rz), and the instruction word of a type performing memory reference (external access), for example, the aforementioned instruction word (RD Rx, off, Rz).

In the data processor having a pipeline processing function of a conventional technique as above-mentioned, basically, the pipeline processing is executed in the same procedure for both the instruction word processing of a type not performing memory reference, and the instruction word processing of a type reading data from the memory by the external access (performs memory reference). Thus, when the two types of instruction words are mixed, the processing in the memory reference stage for reading and writing data from and into the memory must be finished in one cycle. However, generally, an operation speed of the external memory is slower as compared with that of the data processor itself, so that usually a data cache is used to meet such requirement. However, since the data cache is comparatively expensive, when the data processor is used, for example, for a so-called built-in use, or used as a controller for various domestic electrical appliances, it is difficult to be adopted from restrictions of cost. And hence, in the past, the pipeline processing was not performed, or a method of reducing the data processing speed so as to finished processing in the memory reference stage in one cycle, in other words, a method of extending a one cycle time has been adopted.

SUMMARY OF THE INVENTION

The present invention has been devised in view of such circumstances, therefore, it is an object thereof to provide a data processor having a pipeline processing function, whereby the pipeline processing is performed smoothly even when a memory access or processing for reading data from a memory extends over two cycles.

It is another object of the present invention to provide a data processor having a pipeline processing function, whereby in case of using a register in which a succeeding instruction is rewritten by a preceding instruction, pipeline processing of the succeeding instruction is stopped temporarily to avoid a so-called register conflict.

The data processor according to the present invention comprises a register file including a plurality of registers, and a pipeline processing function for executing a processing of an instruction word by dividing it into a plurality of stages including a write stage for storing the processed result into any one of registers of the register file, and which processes instruction words of a plurality of types including an external access type reading data from the outside by external accessing and storing it into any one of registers of the register file at the write stage, and further comprises data storing means for storing data having been read from the outside by processing of an instruction word of the external access type; register information storing means for storing a register information specifying a register into which data of processed result by an instruction word of the external access type is to be stored; and controlling means for storing data having been read from the outside by processing of an instruction word of the external access type into the data storing means temporarily, and for storing the data stored in the data storing means into a register which is specified by the register information stored in the register information storing means, at the write stage when an instruction word of the external access type is processed next.

In the data processor according to the present invention, data read from the outside by processing of the instruction word of the external access type is stored temporarily in the data storing means, and in the write stage at the time of processing the instruction word of the external access type next, the data stored in the data storing means is stored in the register specified by the register information stored in the register information storing means. Thereby, the pipeline processing is executed smoothly irrespective of the time required for external access by the external access type instruction word.

Meanwhile, the data processor according to the present invention comprises a register file including a plurality of registers, and a pipeline processing function for executing a processing of an instruction word by dividing it into a plurality of stages including a write stage for storing the processed result into any one of registers of the register file, and which processes instruction words of a plurality of types including an external access type reading, data from the outside by external accessing and storing it into any one of registers of the register file at the write stage, and further comprises data storing means for storing data having been read from the outside by processing of an instruction word of the external access type; register information storing means for storing a register information specifying a register into which data of processed result by an instruction word of the external access type is to be stored; and controlling means, comprising comparing means for comparing an information stored in the register information storing means with an information specifying a register which is used by an instruction word following an instruction word of the external access type, for storing data having been read from the outside by processing of an instruction word of the external access type into the data storing means temporarily, for storing the data stored in the data storing means into a register which is specified by the register information stored in the register information storing means, at the write stage when an instruction word of the external access type is processed next, and for stopping executing of an instruction word following an instruction word of the external access type until the instruction word of the external access type finishes external accessing, when the comparing means detects a coincidence before external accessing by an instruction word of the external access type is finished.

In the data processor according to the present invention, when the comparing means detects coincidence before finishing the external access by the instruction word of the external access type, execution of the instruction word succeeding the instruction word of the external access type is suspended till the external access by the instruction word of the external access type is finished. Thereby, the pipeline processing of the succeeding instruction is stopped temporarily and a so-called register conflict is avoided.

The above and further objects and features of the invention will more fully be apparent from the following detailed description with accompanying drawings.

BRIEF DESCRIPTION OF THE DRAWINGS

FIG. 2 is a schematic view showing a configuration of a pipeline and a flow of processing by respective stages of a conventional data processor, when an instruction word is processed in a 5-stage pipeline;

FIG. 3 is a schematic view showing a configuration of a pipeline and a flow of processing by respective stages of a conventional data processor, when an instruction word is processed in a 5-stage pipeline;

FIG. 4 is a schematic view showing an example of formats of instruction word processed by a data processor of the present invention;

FIG. 10 is a timing chart showing a flow of pipeline processing in case of processing the case where, conventionally, a register conflict occurs, by a data processor of the present invention.

DESCRIPTION OF THE PREFERRED EMBODIMENTS

Figure 1:
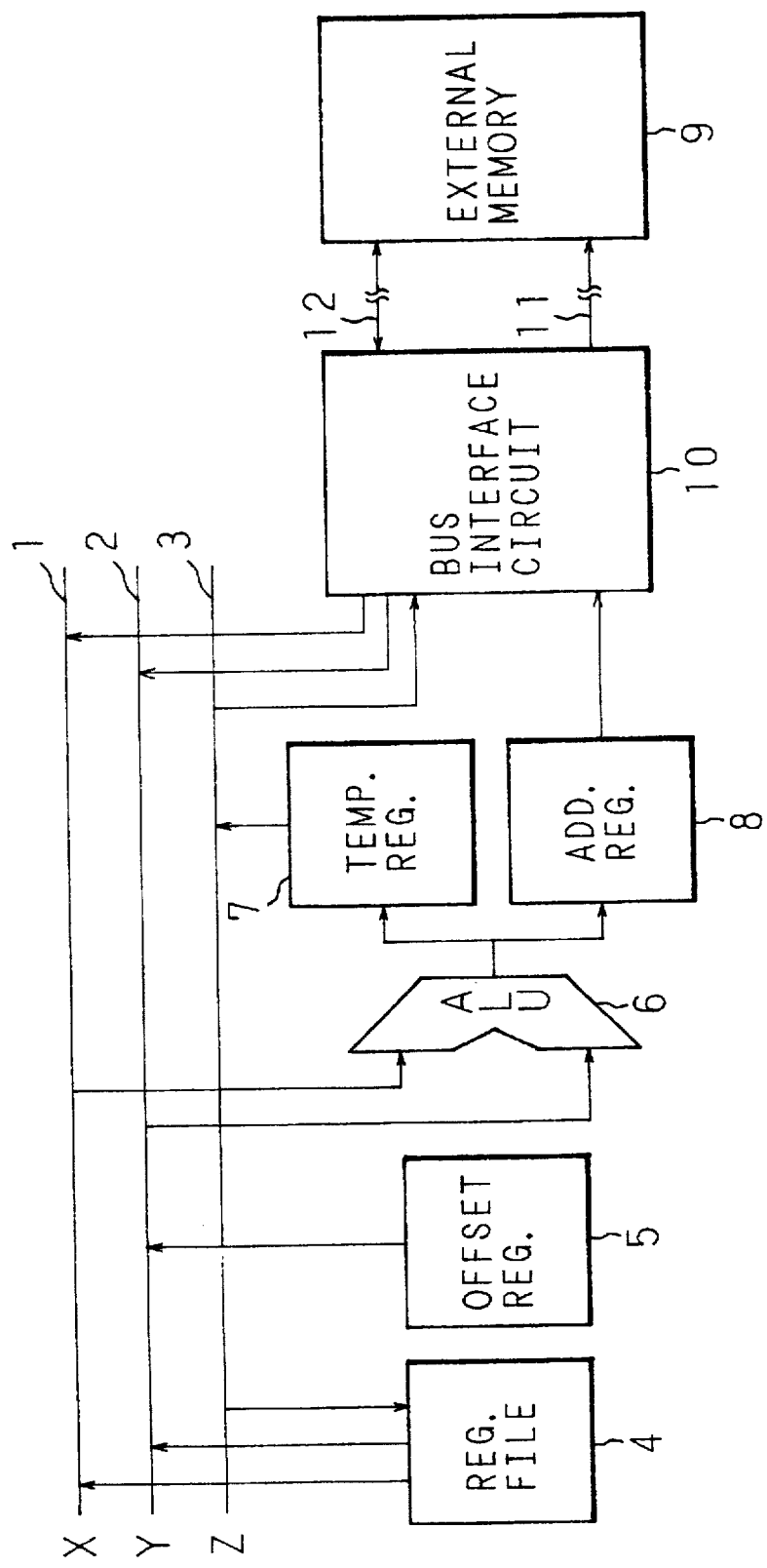
FIG. 1 is a block diagram showing a configuration example of a data path of a data processor having a conventional pipeline processing function.

In the following, the present invention is particularly described on the basis of the drawings showing the embodiment thereof. At first, an instruction word processed by a data processor having a pipeline processing function of the present invention is described, and thereafter, a configuration of the data processor having the pipeline processing function of the present invention is described.

The instruction word processed by the data processor having the pipeline processing function of the present invention has a 32-bit length, and is composed of a field for specifying the kind of operation to be executed or the operation such as memory read, a field for specifying a register, or a field for specifying offset data. There are several kinds of formats, and the format to be used for individual instruction word is fixed. There is also a case where a specific field such as a field for specifying a register Ry is not present in a certain kind of format. In the following, an example of instruction words processed by the data processor of the present invention are shown, and in a schematic view of FIG. 4, an example of formats of the instruction word are shown.

InstruCtion Word (ADD Rx, Ry, Rz)

Instruction Word (RD Rx, off, Rz)

Instruction Word (OR Rx, Ry, Rz)

Instruction Word (SUB Rx, Ry, Rz)

Instruction Word (AND Rx, Ry, Rz)

The instruction word (ADD Rx, Ry, Rz) is for arithmetic addition, which specifies processing of adding the content of a source register specified by Rx and the content of a source register specified by Ry, and writing the addition result into a destination register specified by Rz. The instruction word (RD Rx, off, Rz) is for transferring data, which specifies processing of reading data from an external memory with the addition result of the content of the source register specified by Rx and offset data of a value off as an address, and writing the data into the destination register specified by Rz. The instruction word (OR Rx, Ry, Rz) is for OR operation, which specifies processing of logical sum of the content of the source register specified by Rx and the content of the source register specified by Ry, and writing the result into the destination register specified by Rz. The instruction word (SUB Rx, Ry, Rz) is for arithmetic subtraction, which specifies processing of subtracting the content of source register specified by Ry from the content of the source register specified by Rx, and writing the result into the destination register specified by Rz. The instruction word (AND Rx, Ry, Rz) is for AND operation, which specifies processing of logical product of the content of the source register specified by Rx and the content of the source register specified by Ry, and writing the result into the destination register specified by Rz.

In order to facilitate decoding by the data processor of the present invention, the instruction words are that, the fields having the same object to be specified are fixed to locate in the same bit position even when their formats are different from each other. For example, in an instruction word format designated by numeral 100 in FIG. 4, bit 0 to bit 4 form the field Rz, bit 5 to bit 9 from the field Rx, bit 10 to bit 14 form the field Ry and bit 15 to bit 31 form the field specifying the operation (ADD).

Also, in an instruction word format designated by numeral 101 in FIG. 4, the bit 0 to bit 4 form the field Rz, the bit 5 to bit 9 form the field Rx, the bit 10 to bit 25 form the field off and the bit 26 to bit 31 form the field specifying the RD.

It is also possible to specifies OR, SUB, AND by the field of bit 15 to bit 31 of the format 100. Thus, for example, in the aforementioned instruction word, the fields Rz of the respective instruction words are in the same bit position, the bit 0 to bit 4, in all formats, and similarly, the fields Rx of the instruction words are also in bit 5 to bit 9. Also, the fields Ry of the instruction word (ADD Rx, Ry, Rz), instruction word (OR Rx, Ry, Rz), instruction word (SUB Rx, Ry Rz) and instruction word (AND Rx, Ry, Rz) are in the bit 10 to bit 14.

Next, a configuration of the data processor of the present invention is described.

In the data processor of the present invention, basically, processing of the instruction word is performed in a 4-stage pipeline. A configuration of respective stages of the pipeline is as follows. A first stage is a fetch stage, where the instruction word is fetched from an instruction word cache. A second stage is a decode stage, where the fetched instruction word is decoded. A third stage is an execution stage, where operation specified by the instruction word is executed by an arithmetic and logic unit. A fourth stage is a write stage, where the operation result obtained in the execution stage is written into a register.

Figure 5:
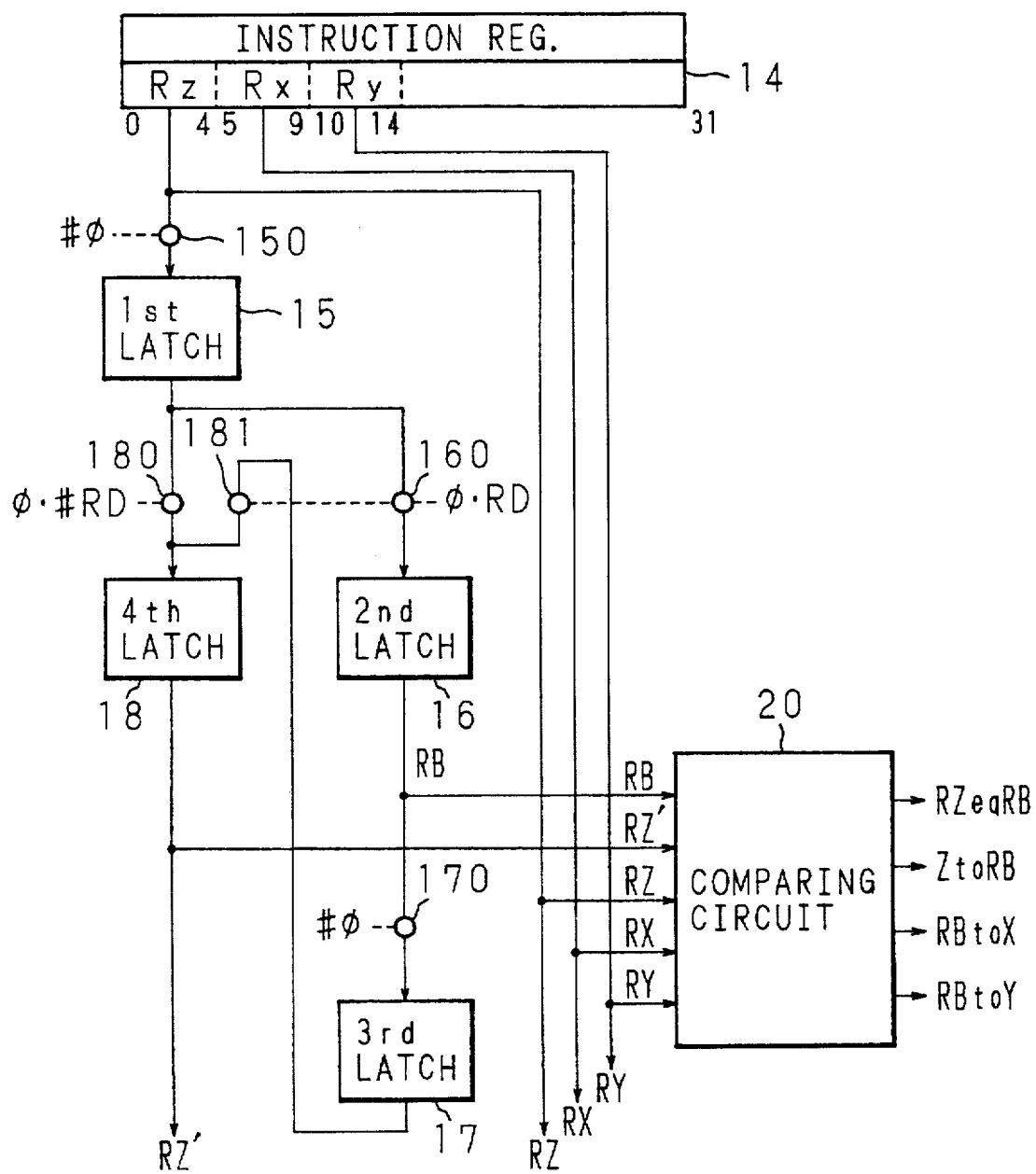
FIG. 5 is a block diagram showing a configuration example of essential portion of a control circuit of a data processor of the present invention.

FIG. 5 is a block diagram showing a configuration example of essential portion of a control circuit of a data processor of the present invention. In FIG. 5, portions indicated by "0" specify gates which transmit signals when signals given from signal lines shown by broken lines connected thereto are logical "1". The signal $\phi$ shows a synchronous clock signal of the data processor of the present invention, and the signal #$\phi$ is its reverse signal. The signal $\phi$.#RD shows a control signal which becomes logical "1" in a first half of processing in the execution stage of the instruction word other than the instruction word reading data from the memory, and whether or not the signal $\phi$#RD is to be outputted is known at the time point of decoding the instruction word. The signal $\phi$.RD shows a control signal which becomes logical "1" in a first half cycle, at the time of processing the instruction word reading data from the memory in the execution stage, and whether or not the signal $\phi$.RD is to be outputted is known at the time point of decoding the instruction word.

Numeral 14 designates an instruction word register, which is connected to an instruction cache, not shown, and holds respective bits of the instruction word corresponding to the decode stage of the pipeline.

Numeral 15 designates a first latch, which is connected to a portion storing the bit 0 to bit 4 of the instruction word register 14, specifically, a portion storing the fields Rz of the respective instruction words, via a gate 150. The gate 150 is controlled by the signal #$\phi$. Specifically, the gate 150 transmits a signal of the bit 0 to bit 4 of the instruction word register 14 to the first latch 15 when the signal #$\phi$ is logical "1".

Numeral 16 designates a second latch, which functions as register information storing means, and which is connected to an output of the first latch 15 via a gate 160. The gate 160 is controlled by the signal $\phi$.RD. Specifically, the gate 160 transmits a signal outputted by the first latch 15 to the second latch 16 when the signal $\phi$.RD is logical "1".

Numeral 17 designates a third latch, which is connected to an output of the second latch 16 via a gate 170. The gate 170 is controlled by the signal #100. Specifically, the gate 170 transmits a signal RB outputted from the second latch 16 to the third latch 17 when the signal #$\phi$ is logical "1".

Numeral 18 designates a fourth latch, which is connected to the output of the first latch 15 via a gate 180, and to an output of the third latch 17 via a gate 181. The gate 180 is controlled by the signal $\phi$.#RD, and the gate 181 is controlled by the signal $\phi$.RD. Specifically, the gate 180 transmits the signal outputted by the first latch 15 to the fourth latch 18 when the signal $\phi$.#RD is logical "1". The gate 181 transmits the signal outputted by the third latch 17 to the fourth latch 18 when the signal $\phi$.RD is logical "1".

In the following description, an output of a portion corresponding to the bit 5 to bit 9 of the instruction word register 14, or a portion storing the field Rx of the respective instruction words is referred to as a signal RX, an output of a portion corresponding to the bit 10 to bit 14 of the instruction word register 14, or a portion storing the field Ry of the respective instruction words other than the instruction word (RD Rx, off, Rz) is referred to as a signal RY, and an output of a portion corresponding to the bit 0 to bit 4 of the instruction word register 14, or a portion storing the field Rz of the respective instruction words is referred to as a signal RZ. Meanwhile, an output of the fourth latch 18 is referred to as a signal RZ', and an output of the second latch 16 is referred to as a signal RB.

Numeral 20 designates a comparing circuit which functions as controlling means as well as comparing means, compares the signals RX, RY, RZ and RZ' with the signal RB, and outputs signals RBtoX, RBtoY, ZtoRB and RZeqRB representing the comparison results. The signal RBtoX becomes logical "1" when the signal RX and the signal RB coincide with each other, the signal RBtoY becomes logical "1" when the signal RY and the signal RB coincide with each other and the signal ZtoRB becomes logical "1" when the signal RZ' and the signal RB coincide with each other. The signal RZeqRB becomes logical "1" when the signal RZ and the signal RB coincide with each other.

Figure 6:
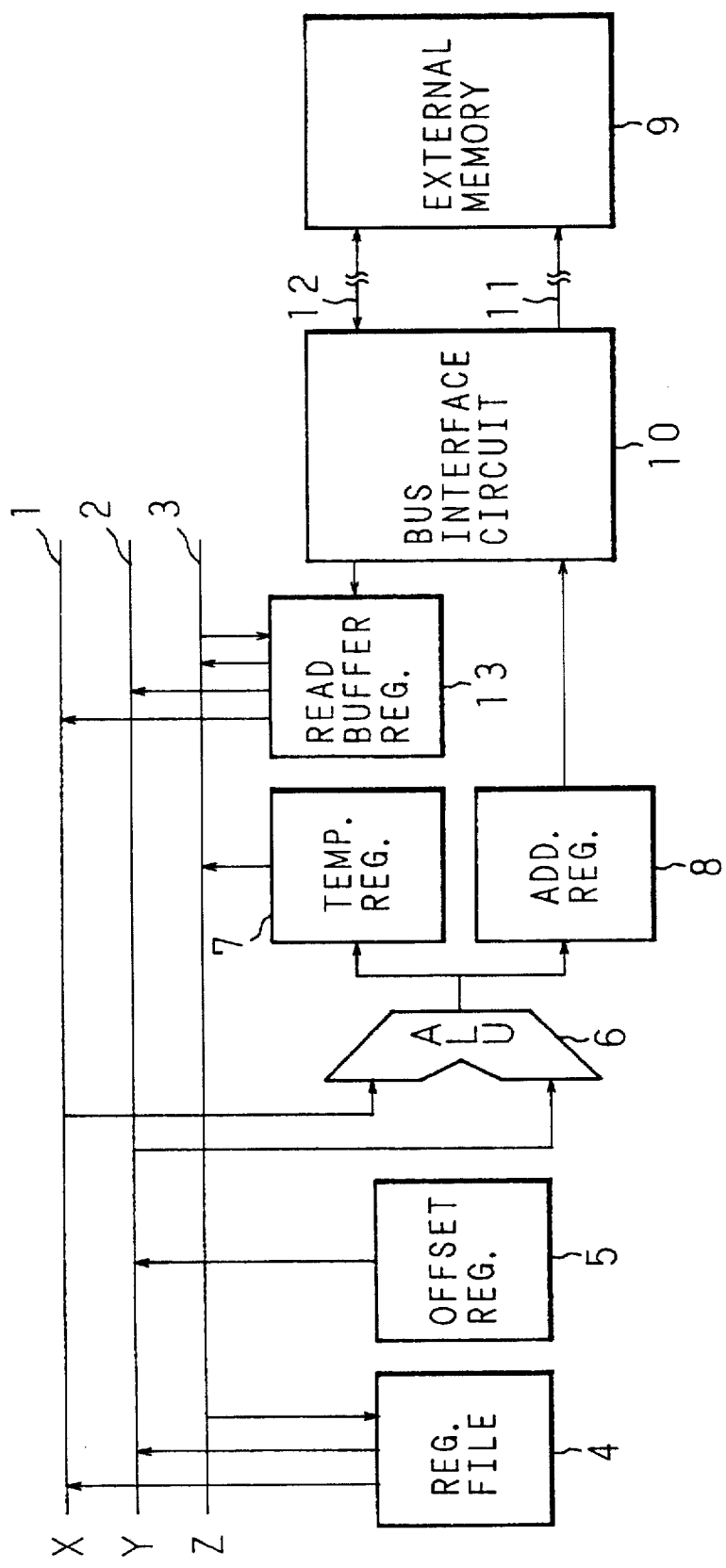
FIG. 6 is a block diagram showing a configuration example of a data path of a data processor of the present invention.

FIG. 6 is a block diagram showing a configuration example of a data path of the data processor of the present invention. In FIG. 6, numeral 1 designates a first data bus, hereinafter referred to as an X bus, in the data path, numeral 2 designates a second data bus, hereinafter referred to as a Y bus, in the data path, and numeral 3 designates a third data bus, hereinafter referred to as a Z bus, in the data path.

Numeral 4 designates a register file composed of a plurality of registers. The register file 4 has output paths to the X bus 1 and Y bus 2, and an input path from the Z bus 3. In the decode stage, the content of a register specified by the signal RX and the content of a register specified by the signal RY are read from the register file 4. When the field Rx of the instruction word is valid in the decode stage and the signal RBtoX is logical "0", the content of the register specified by the signal RX is outputted to the X bus 1 in the execution stage. When the field Ry of the instruction word is valid in the decode stage and the signal RBtoY is logical "0", the content of the register specified by the signal RY is outputted to the Y bus 2 in the execution stage. Furthermore, when the field RZ of the instruction word is valid in the decode stage and the signal ZtoRB is logical "0" in the execution stage, data is written into the register specified by the signal RZ' from the Z bus 3 in the write stage.

Numeral 5 designates an offset register having an output path to the Y bus 2. When the field off of the instruction word specifying offset data is valid in the decode stage, the content of the offset register 5 is outputted to the Y bus 2 in the execution stage.

Numeral 6 designates an arithmetic and logic unit (ALU) having input paths from the X bus 1 and Y bus 2. The arithmetic and logic unit 6 inputs data of the X bus i and data of the Y bus 2 in the execution stage, and executes the arithmetic operation or logical operation specified by the instruction word to the two data.

Numeral 7 designates a temporary register and numeral 8 designates an address register, both of which are connected to the arithmetic and logic unit 6. When the result obtained by the arithmetic and logic unit 6 in the execution stage is the operation result, the temporary register 7 holds the operation result temporarily, and outputs it to the Z bus 3 in the write stage. When the result obtained by the arithmetic and logic unit 6 in the execution stage is an address to an external memory 9, an address register 8 holds it.

Numeral 10 designates a bus interface circuit having an input path from the address register 8 and an output path to a read buffer register 13 to be described later. The bus interface circuit 10 is connected to the external memory 9 through an address bus 11, a data bus 12 and a control signal line, not shown. Thus, when an address is given from the address register 8, the bus interface circuit 10 gives it to the external memory 9 via the address bus 11 to access to the external memory 9, so that data corresponding to the address is read out via the data bus 12.

Numeral 13 designates the aforementioned read buffer register which functions as data storing means. The read buffer register has input paths from the bus interface circuit 10 and the Z bus 3, and output paths to the X bus 1, Y bus 2 and Z bus 3. When the field Rx of the instruction word is valid in the decode stage and the signal RBtoX is logical "1", the read buffer register 13 outputs its own content to the X bus 1 in the execution stage. Also, when the field Ry of the instruction word is valid in the decode stage and the signal RBtoY is logical "1", the read buffer register 13 outputs its own content to the Y bus 2 in the execution stage. Furthermore, when the field Rz of the instruction word is valid in the decode stage and the signal ZtoRB is logical "1" in the execution stage, data of the Z bus 3 is written into the read buffer register 13 in the write stage. Still further, when the field Rz of the instruction word is valid in the decode stage, and the instruction word processed in the execution stage is the instruction word reading data from the external memory 9, the content of the read buffer register 13 is outputted to the Z bus 3 in the write stage.

Now, the operation of the data processor having the pipeline processing function of the present invention is described, at first for the case of processing one instruction word to show a basic processing procedure, and next for the case of processing, continuously, a plurality of instruction words including the instruction word reading data from the external memory 9, to show the processing procedure at the time of reading the data from the memory.

Figure 7:
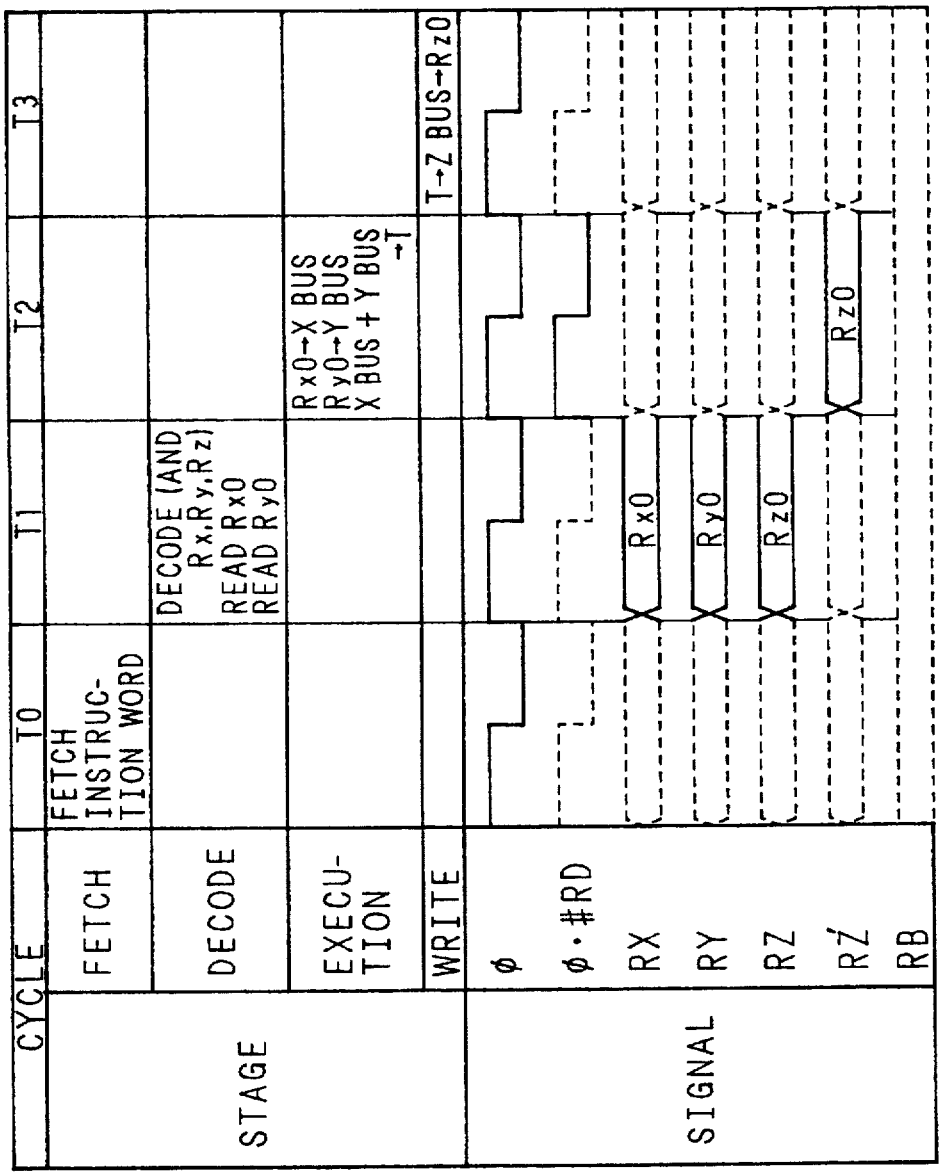
FIG. 7 is a timing chart showing a flow of pipeline processing in case of processing one instruction word by a data processor of the present invention.

FIG. 7 is a timing chart showing a flow of pipeline processing in case of processing one instruction word. Hereupon, procedures of pipeline processing of the aforementioned instruction word (ADD Rx, Ry, Rz) of the arithmetic addition as an example of the instruction word is described. The instruction word (ADD Rx, Ry, Rz) adds (ADD) the content of the source register specified by Rx and the content of the source register specified by Ry and writes the addition result into the destination register specified by Rz, and memory reference is not performed.

In addition, as to the processing procedure of the instruction word (ADD Rx, Ry, Rz) shown in FIG. 7, the signals RX, RY, RZ, RZ' do not coincide with the signal RB. In FIG. 7, reference characters T0, T1, T2, T3 specify respective cycles of a synchronous clock. Columns of "fetch", "decode", "execution", "write" respectively show the processing contents in the fetch stage, decode stage, execution stage and write stage, and φ, φ.#RD, RX, RY, RZ, RZ', RB in a signal column respectively show the contents of the synchronous clock signal, signal φ.#RD, signal RX, signal RY, signal RZ, signal RZ' and signal RB of the data processor of the present invention.

In the cycle T0, the instruction word is processed in the fetch stage. Specifically, the instruction word (ADD Rx, Ry, Rz) is fetched from the instruction word cache.

In the cycle T1, the instruction word is processed in the decode stage. Specifically, the instruction word (ADD Rx, Ry, Rz) is sent to and held in the instruction word register 14, and decoded by a decoder, not shown. Thereby, it is prepared to output, in the execution stage, control signals necessary for executing the instruction word (ADD Rx, Ry, Rz). At this time, when it is assumed that Rx0 is held in the field Rx, Ry0 is held in the field Ry and Rz0 is held in the field Rz of the instruction word register 14, Rx0, Ry0 and Rz0 are outputted as the signal RX, signal RY and signal RZ. Thus, during the cycle T1, the content of the register specified by Rx0 and the content of the register specified by Ry0 in the instruction word register 14 are read respectively from the register file 4 (read Rx, read Ry).

Since the signal #φ rises to logical "1" at the beginning of a second half of the cycle T1, Rz0 outputted as the signal RZ is outputted from the gate 150 and held in the first latch 15.

In the cycle T2, the instruction word is processed in the execution stage. Specifically, control signals for executing the instruction word (ADD Rx, Ry, Rz) is outputted to respective portions of the data path shown in FIG. 6. Thereby, from the register file 4, the content of the register specified by Rx0 is outputted to the X bus 1, and the content of the register specified by Ry0 is outputted to the Y bus 2 (Rx0→X bus, Ry0→Y bus). Then, data outputted to the X bus 1 and data outputted to the Y bus 2 are added by the arithmetic and logic unit 6, and the result is held in the temporary register 7 (X bus+Y bus→T).

Since the signal φ.RD rises to logical "1" at the beginning of the cycle T2, Rz0 held in the first latch 15 in the cycle T1 is outputted from the gate 180 and latched in the fourth latch 18. Thus, in the cycle T2, Rz0 is outputted from the fourth latch 18 as the signal RZ'.

In the cycle T3, the instruction word is processed in the write stage. Specifically, the content of the temporary register 7 is outputted to the Z bus 3, and since RzO is outputted as the signal RZ', this data is written into the register in the register file 4 specified by Rz0 (T→Z bus→Rz0).

In the data processor having the pipeline processing function of the present invention, processing of one instruction word is performed in the above-mentioned procedures.

Figure 8:
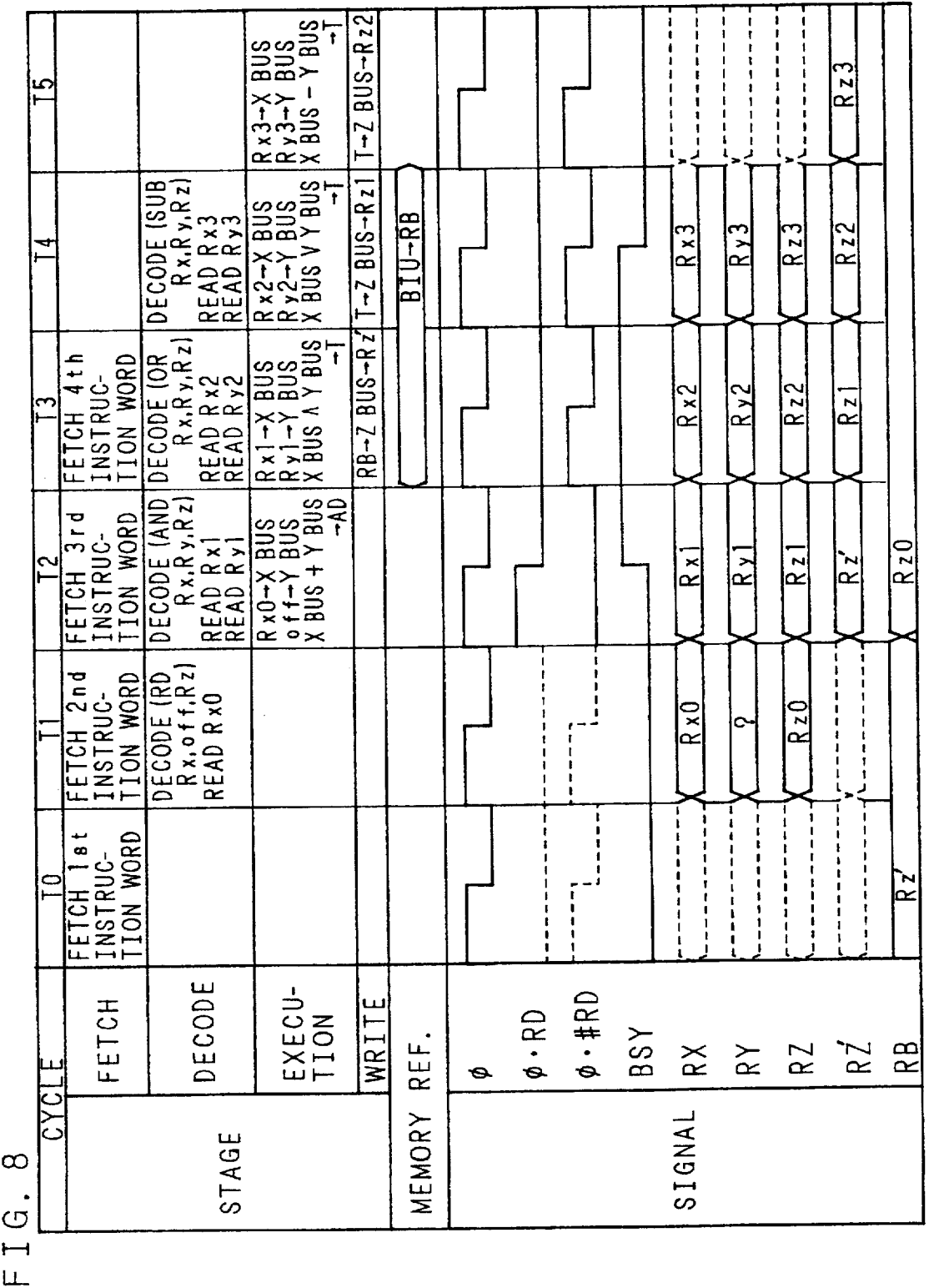
FIG. 8 is a timing chart showing a flow of pipeline processing in case of processing, continuously, a plurality of instruction words including an instruction word which reads data from a memory (performs memory reference) by a data processor of the present invention.

FIG. 8 is a timing chart showing a flow of pipeline processing in case of processing, continuously, a plurality of instruction words including the instruction word reading data from a memory, or performing memory reference. Hereupon, as an example of plurality of instruction words processed continuously, procedures of processing of the aforementioned instruction word (RD Rx, off, Rz) as the first instruction word, and the instruction word (AND Rx, Ry, Rz) which is the same type as the instruction word (ADD Rx, Ry, Rz) not performing memory reference, that is, having the fields Rx, Ry, Rz and performing logical product (AND) operation as the second instruction word is described. Furthermore, it is assumed that, the third instruction word (OR Rx, Ry, Rz) and the fourth instruction word (SUB Rx, Ry, Rz) not performing the memory reference are processed successively after the second instruction word (AND Rx, Ry, Rz).

It is assumed that, Rx0 as the content of the field specifying Rx and Rz0 as the content of the field specifying Rz are held in the first instruction word (RD Rx, off, Rz), which is, hereinafter, referred to as the first instruction word (RD Rx0, off, Rz0). It is assumed that, Rx1 as the content of the field specifying Rx, Ry1 as the content of the field specifying Ry and Rz1 as the content of the field specifying Rz are held in the second instruction word (AND Rx, Ry, Rz), which is, hereinafter, referred to as the second instruction word (AND Rx1, Ry1, Rz1).

Furthermore, it is assumed that, Rx2 as the content of the field specifying Rx, Ry2 as the content of the field specifying Ry and Rz2 as the content of the field specifying Rz are held in the third instruction word (OR Rx, Ry, Rz), which is, hereinafter, referred to as the third instruction word (OR Rx2, Ry2, Rz2). It is assumed that, Rx3 as the content of the field specifying Rx, Ry3 as the content of the field specifying Ry and Rz3 as the content of the field specifying Rz are held in the fourth instruction word (SUB Rx, Ry, Rz), which is, hereinafter, referred to as the fourth instruction word (SUB Rx3, Ry3, Rz3).

The first instruction word (RD Rx0, off, Rz0) adds the content of a source register specified by Rx0 and offset data specified by off, and writes data, which is read from the memory with the result as an address, into a destination register specified by Rz0. The second instruction word (AND Rx1, Ry1, Rz1) executes logical product operation of the content of a source register specified by Rx1 and the content of a source register specified by Ry1, and writes the result into a destination register specified by Rz1.

The third instruction word (OR Rx2, Ry2, Rz2) executes logical sum operation of the content of a source register specified by Rx2 and the content of a source register specified by Ry2, and writes the result into a destination register specified by Rz2. The fourth instruction word (SUB Rx3, Ry3, Rz3) performs arithmetic subtraction of the content of a source register specified by Rx3 and the content of a source register specified by Ry3, and writes the result into a destination register specified by Rz3.

Meanwhile, in FIG. 8, reference characters T0 to T5 designate respective cycles of a synchronous clock. Columns of "fetch", "decode", "execute" and "write" respectively show the processing contents in the fetch stage, decode stage, execution stage and write stage, and "memory reference" shows a memory access executed by the bus interface circuit 10 which operates in parallel to the pipeline processing. In a signal column, $\phi$, $\phi$.RD, $\phi$.#RD, BSY, RX, RY, RZ, RZ', RB respectively show the contents of the synchronous clock signal, signal $\phi$.RD, signal $\phi$.#RD, signal BSY, signal RX, signal RY, signal RZ, signal RZ' and signal RB.

The signal BSY becomes logical "1" at a second half cycle and returns to logical "0" at a second half of a last cycle of memory reference, at the time of processing the instruction word reading data from the external memory 9 in the execution stage.

In the cycle T0, the first instruction word (RD Rx0, off, Rz0) is processed in the fetch stage. Specifically, the first instruction word (RD Rx0, off, Rz0) is fetched from the instruction word cache. It is assumed that an instruction word (RD Rx', off', Rz') which reads data from the memory is processed before processing of the first instruction word (RD Rx0, off, Rz0). Thus, a signal RB at this time point is Rz' of the instruction word (RD Rx', off', Rz') reading the data from the memory processed previously.

In the cycle T1, the first instruction word (RD Rx0, off, Rz0) is processed in the decode stage. Specifically, the first instruction word (RD Rx0, off, Rz0) fetched in the cycle T0 is sent to and held in the instruction word register 14, and decoded by a decoder, not shown. Thereby, it is prepared to output, in the execution stage, control signals necessary for executing the first instruction word (RD Rx0, off, Rz0). At this time, since Rx0 is held in the field Rx and Rz0 is held in the field Rz of the instruction word register 14, Rx0 is outputted as the signal RX and Rz0 is outputted as the signal RZ. Thus, during this cycle, the content of the register specified by Rx0 in the instruction word register 14 is read out from the register file 4 (read Rx0).

In the first instruction word (RD Rx0, off, Rz0), since the field Ry is invalid, the signal RY also becomes undefined (?), and the other register read out simultaneously with the register specified by Rx0 becomes undefined. However, since this is not used, it is not problematic. The comparing circuit 20 compares the signal RX with signal RB, and when the two signals coincide with each other, a signal RBtoX becomes logical "1". However, in this case, since the signal RB is Rz' of the instruction word (RD Rx', off', Rz') processed previously succeeding the clock T0, they do not coincide with each other. Thus, the signal RBtoX becomes logical "0".

Since the signal #$\phi$ rises to logical "1" at the beginning of a second half of the cycle T1, Rz0 outputted as the signal RZ is outputted from the gate 150 and held in the latch 15.

Simultaneously with processing of the first instruction word (RD Rx0, off, Rz0) in the decode stage, in the cycle T1, the next second instruction word (AND Rx1, Ry1, Rz1) is fetched from the instruction word cache memory in the fetch stage.

In the cycle T2, the first instruction word (RD Rx0, off, Rz0) is processed in the execution stage. Specifically, control signals for executing the first instruction word (RD, Rx0, off, Rz0) is outputted to respective portions of the data bus shown in FIG. 6. Thereby, either a value of the read buffer register 13 or the content of the register specified by Rx0 in the register file 4 is outputted to the X bus 1 corresponding to a value of the signal RBtoX ("1" or "0"), and the content of the offset register 5 is outputted to the Y bus 2. However, in this case, since the signal RBtoX is logical non, the content of the register specified by Rx0 in the register file 4 is outputted to the X bus 1, and the content of the offset register 5 is outputted to the Y bus 2 (Rx0→X bus, off→Y bus). The arithmetic and logic unit 6 adds data outputted to the X bus 1 and data outputted to the Y bus 2, and the result is held in the address register 8 (X bus+Y bus→AD).

Now, in the cycle T2, since the first instruction word (RD Rx0, off, Rz0) is the instruction word performing the memory reference, the signal $\phi$.RD becomes logical "1" in the first half. And hence, Rz0 held in the first latch 15 is written into the second latch 16 from the gate 160, and Rz' held in the third latch 17 is written into the fourth latch 18 from the gate 181. Thus, Rz0 is outputted as the signal RB, and Rz' is outputted as the signal RZ'.

In the cycle T2, the second instruction word (AND Rx1, Ry1, Rz1) is processed in the decode stage. Specifically, the second instruction word (AND Rx1, Ry1, Rz1) fetched in the cycle T1 is sent to and held in the instruction word register 14, and decoded by a decoder, not shown. Thereby, it is prepared to output, in the execution stage, control signals necessary for executing the second instruction word (AND Rx1, Ry1, Rz1). At this time, since Rx1 is held in the field Rx, Ry1 is held in the field Ry and Rz1 is held in the field Rz of the instruction word register 14, Rx1, Ry1 and Rz1 are outputted as the signal RX, signal RY and signal RZ. Thus, during this cycle, the content of the register specified by Rx1 and the content of the register specified by Ry1 in the instruction word register 14 are respectively read from the register file 4 (read Rx1, read Ry1).

Also, at this time, the comparing circuit 20 compares the signal RX, signal RY and signal RZ with the signal RB, thus when the signal RX and the signal RB coincide with each other, the signal RBtoX becomes logical "1", when the signal RY and the signal RB coincide with each other, the signal RBtoY becomes logical "1", and when the signal RZ and the signal RB coincide with each other, the signal RZeqRB becomes logical "1". However, in this case, since the signal RB is Rz0, they never become logical "1".

In the cycle T3, the first instruction word (RD Rx0, off, Rz0) is processed in the write stage. Hereupon, since the instruction word processed in the execution stage in the cycle T2 is the first instruction word (RD Rx0, off, Rz0) reading data from the memory, data read from the external memory 9 by the instruction word (RD Rx', off Rz') processed before the first instruction word (RD Rx0, off, Rz0) and stored in the read buffer register 13 is outputted to the Z bus 3, and since Rz' is outputted as the signal RZ in the cycle T2, the content of the read buffer register 13 outputted to the Z bus 3 is written into the register specified by Rz' in the register file 4 (RB→Z bus→Rz').

Simultaneously, the bus interface circuit 10 starts memory reference by an address held in the address register 8. Specifically, the bus interface circuit 10 accesses to the external memory 9 by the address obtained from Rx0 and off of the first instruction word (RD Rx0, off, Rz0) in the cycle T2, and makes the read buffer register 13 hold corresponding data (BIU→RB).

In the cycle T3, the second instruction word (AND Rx1, Ry1, Rz1) is also processed in the execution stage. Specifically, control signals for executing the second instruction word (AND Rx1, Ry1, Rz1) is outputted to respective portions of the data path shown in FIG. 6. Thereby, from the register file 4, the content of the register specified by Rx1 is outputted to the X bus 1, and the content of the register specified by Ry1 is outputted to the Y bus 2 (Rx1→X bus, Ry1→Y bus). The arithmetic and logic unit 6 executes logical product operation of data outputted to the X bus 1 and data outputted to the Y bus 2, and the result is held in the temporary register 7 (X bus∧Y bus→T). At this time, the content Rz1 of the field Rz of the second instruction word (AND Rx1, Ry1, Rz1) has been sent to the fourth latch 18 via the first latch 15, and Rz1 is outputted from the fourth latch 18 as the signal RZ'.

In the cycle T4, the second instruction word (AND Rx1, Ry1, Rz1) is processed in the write stage. Specifically, the content of the temporary register 7 is outputted to the Z bus 3, and since the signal RZ' is Rz1, data outputted to the Z bus 3 in the execution stage is written into the register specified by Rz1 in the register file 4 (T→Z bus→Rz1).

Simultaneously, in the cycle T4, though memory reference (BIU→RB) to the external memory 9 by the bus interface circuit 10 by the first instruction word (RD Rx0, off, Rz0) is continued, it is finished at the cycle T4. Data read from the external memory 9 by memory reference of the first instruction word (RD Rx0, off, Rz0) is stored in the read buffer register 13.

Thereafter, for example, even when the third instruction word (OR Rx2, Ry2, Rz2) or the fourth instruction word (SUB Rx3, Ry3, Rz3) are further processed successively, they are processed in order in the respective stages by the same procedure as the second instruction word (AND Rx1, Ry1, Rz1). And, for example, the data read from the external memory 9 by the aforementioned first instruction word (RD Rx0, off, Rz0) and stored in the read buffer register 13, is stored in the register in the register file 4 specified by Rz0 in the fourth cycle (T3), when the first instruction word (RD, Rx0, off, Rz0) is regarded as the instruction word (RD Rx', off', Rz') which has been processed previously in FIG. 8, and processing the instruction word which performs memory reference or reads data from the memory next.

Now, in the above-mentioned example shown in FIG. 8, since the first instruction word (RD Rx, off, Rz) performs memory reference, from a second half of the cycle T2 to a first half of the cycle T4 through the cycle T3, the signal BSY becomes logical "1". And hence, when the signal RBtoX becomes logical "1" or the signal RBtoY becomes logical "1" in a period from a second half of the cycle T2 to the cycle T3, it means that the second instruction word (AND Rx, Ry, Rz) is trying to read the content of the register (specified by Rz) into which the data is written, before the first instruction word (RD Rx, off, Rz) finishes accessing to read the data from the external memory 9, results in a so-called register conflict. When the signal RZeqRB becomes logical "1", the other operation result is to be written into the register into which the data from the external memory 9 is written, and also in this case, the register conflict occurs. However, such a situation is hindered by interrupting processing of the second instruction word in the decode stage.

Figure 9:
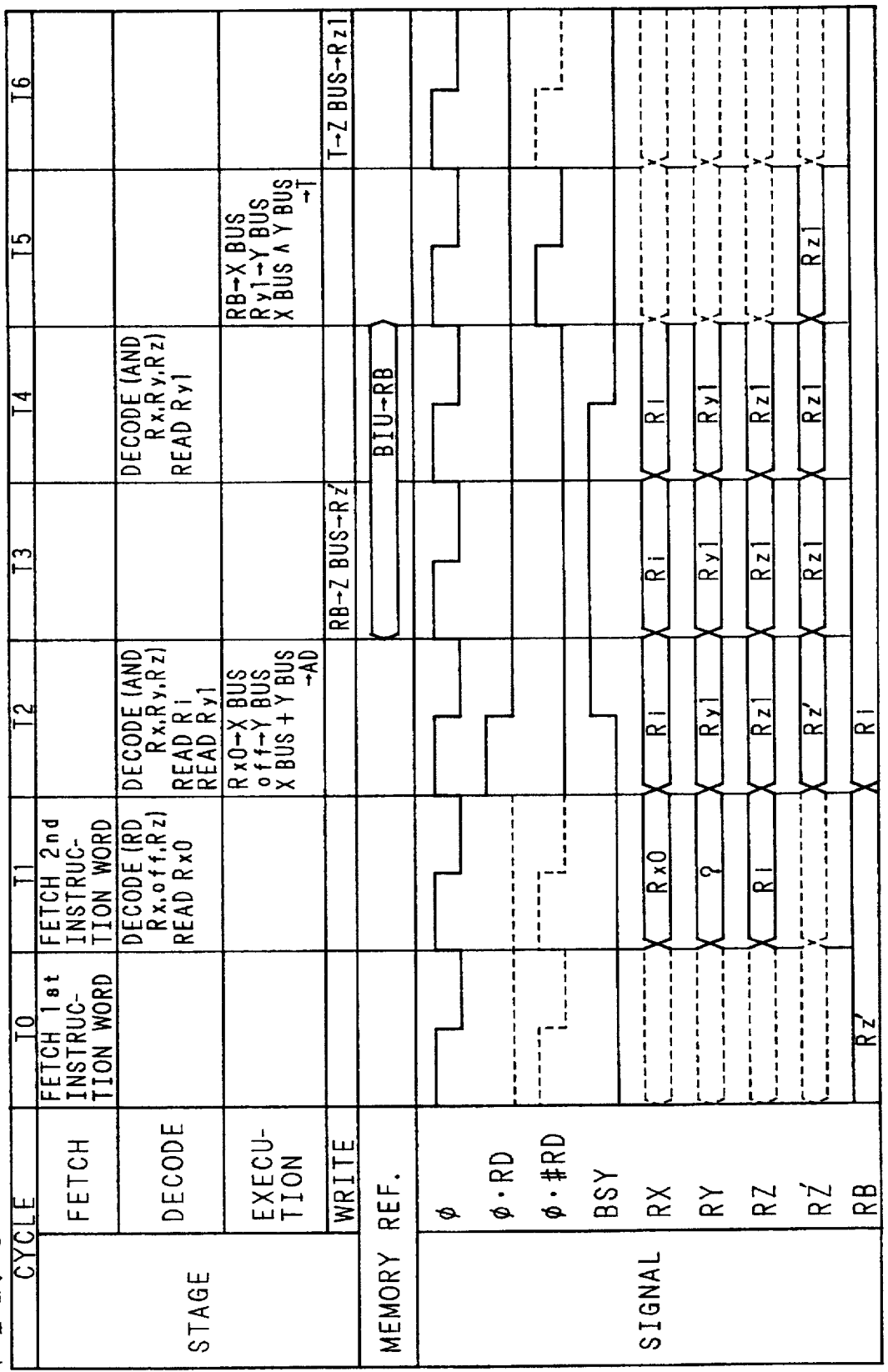
FIG. 9 is a timing chart showing a flow of pipeline processing in case of processing the case where, conventionally, a register conflict occurs, by a data processor of the present invention.

For example, as shown in a timing chart of FIG. 9, the case of processing the instruction word (RD Rx0, off, Ri) as the first instruction word (RD Rx, off, Rz) and the instruction word (AND Ri, Ry1, Rz1) as the second instruction word (AND Rx, Ry, Rz) in series is considered. The second instruction word (AND Ri, Ry1, Rz1) reads and uses the content of the register specified by Ri, after data read from the external memory 9 by the first instruction word (RD Rx0, off, Ri) is stored in the register specified by Ri.

In this case, according to the decoding result of the second instruction word (AND Ri, Ry1, Rz1), since the signal RX becomes Ri in the cycle T2, the signal RBtoX becomes logical "1". And hence, processing of the second instruction word (AND Ri, Ry1, Rz1) in the decode stage is delayed till the cycle T4, and processing in the execution stage is performed in the cycle T5. From the cycle T4 on, in place of the register specified by Ri of the register file 4, the read buffer register 13 is used.

Specifically, it is as follows. In the cycle T4, data read from the external memory 9 by the first instruction word (RD Rx0, off, Ri) is stored in the read buffer register 13 (BIU→RB). The second instruction word (AND Ri, Ry1, Rz1) is processed as follows. The content of the read buffer register 13 and the content of the register specified by Ry1 in the register file 4 are read in the cycle T4 (read RB, read Ry1). In the cycle T5, they are read out to the X bus 1 and the Y bus 2 (RB→X bus, Ry1→Y bus), then their logical product is obtained and stored in the temporary register 7 (X bus∧Y bus→T). The result is stored in the register specified by Rzl in the register file 4 in the cycle T6 (T→Z bus→Rz1).

Also, as shown in timing chart of FIG. 10, the case of processing the instruction word (RD Rx0, off, Ri) as the first instruction word (RD Rx, off, Rz) and the instruction word (AND Rx1, Ry1, Ri) as the second instruction word (AND Rx, Ry, Rz) in series is considered. The second instruction word (AND Rx1, Ry1, Ri) stores its own operation result in the register in which the data read from the external memory 9 by the first instruction word (RD Rx0, off, Ri) is stored, or the register specified by Ri.

In this case, according to the decoding result of the second instruction word (AND Rx1, Ry1, Ri), since the signal RZ becomes Ri in the cycle T2, the signal RZeqRB becomes logical "1". And hence, processing of the second instruction word (AND Rx1, Ry1, Ri) in the decode stage is delayed till the cycle T4, and processing in the execution stage is performed in the cycle T5. From the cycle T4 on, in place of the register specified by Ri of the register file 4, the read buffer register is used.

Specifically, it is as follows. In the cycle T4, the data read from the external memory 9 by the first instruction word (RD Rx0, off, Ri) is stored in the read buffer register 13 (BIU→RB). The second instruction word (AND Rx1, Ry1, Ri) is processed as follows. The contents of the registers specified respectively by Rx1, Ry1 in the register file 4 are read in the cycle T4 (read Rx1, read Ry1). They are read out to the X bus 1 and the Y bus 2 in the cycle T5 (Rx1→X bus, Ry1→Y bus), then their logical product is obtained and stored in the temporary register 7 (X bus∧Y bus→T). The result is stored in the read buffer register 13 in the cycle T6 (T→Z bus→RB).

As stated above, in the data processor having the pipeline processing function of the present invention, even when access to the memory extends over two cycles, since data is written into the register file by the instruction word reading the memory data, at the same timing as a timing of writing data into the register file by the other instruction word at the time of processing the instruction word reading the next memory data, the possibility of disturbing the flow of pipeline processing is prevented.

In the aforementioned embodiment, though the case where access to the memory extends over two cycles is described, it is to be understood that the present invention may also be applied to the case where access to the memory extends over three cycles or more.

In the aforementioned embodiment, though a configuration including one read buffer register is described, the present invention may also be applied to the configuration including two or more read buffer registers.

As particularly described heretofore, according to the data processor having the pipeline processing function of the present invention, since the pipeline processing is performed smoothly even when access to the memory extends over two cycles, it is possible to provide the data processor capable of operating at a high speed at a comparatively low cost, without using a comparatively expensive hardware such as a data cache.

When there is a possibility of referring to a register rewritten by data read by memory access of a preceding instruction word, at the time of processing a succeeding instruction word, since processing by the succeeding instruction word is suspended till the memory access by the preceding instruction word is finished, a so-called register conflict in such case is avoided.

In addition, in the abovementioned embodiment, as shown in FIG. 6, one set of combination of the read buffer register (data storing means) 13 and the second latch (register information storing means) 16 is provided. However, it is possible to adopt an configuration in which two sets of combination of them are provided, and two sets of combination are used alternately at every execution of read instructions for reading data from the external. However, read buffer specifying means for specifying which set is used next, and buffering means for buffering address, data width, and the like are required. In the case where such configuration is adopted, it is possible to execute the next read instruction during accessing for the external memory 9. At this time, because the two read buffer registers are used alternately, it is assured that the content of the read buffer register which is used by the next read instruction has been already read. In other words, it is possible to realize the so-called write back operation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A data processor which comprises a register file including a plurality of registers, and a pipeline processing function for executing a processing of an instruction word by dividing said pipeline processing function into a plurality of stages including a write stage, and which processes instruction words of a plurality of types including an external access type for reading data from an external device by external accessing and storing the data into any one of the registers of said register file at said write stage, said data processor further comprising:

data storing means for storing data having been read from the external device by processing an external access type instruction word;

register information storing means for storing register information, wherein the register information specifies a register located internal to the data processor where data processed by the external access type instruction word is to be stored; and controlling means for storing data having been read from the external device, by processing the external access type instruction word, into said data storing means temporarily; and for storing the data stored in said data storing means into a register which is specified by the register information stored in said register information storing means, at the write stage of a subsequent external access type instruction word.

2. A data processor as set forth in claim 1, wherein said pipeline processing function includes:

a fetch stage as a first stage where the instruction word is fetched;

a decode stage as a second stage where the fetched instruction word is decoded;

an execution stage as a third stage where an operation specified according to the decode result by said decode stage is executed; and a write stage as a fourth stage where the operation result obtained in said execution stage is written into said register.

3. A data processor which comprises a register file including a plurality of registers, and a pipeline processing function for executing a processing of an instruction word by dividing said pipeline processing function into a plurality of stages including a write stage for storing the processed result into any one of registers of said register file, and which processes instruction words of a plurality of types including an external access type for reading data from an external device by external accessing and storing the data into any one of registers of said register file at said write stage, said data processor further comprising:

data storing means for storing data having been read from the external device by processing an external access type instruction word;

register information storing means for storing register information, wherein the rgister information specifies a register located internal to the data processor where data processed by the external access type instruction word is to be stored; and controlling means, comprising comparing means for comparing an information stored in said register information storing means with an information specifying a register which is used by an instruction word following an instruction word of said external access type, for storing data having been read from the external device by processing an external access type instruction word into said data storing means temporarily;

for storing the data stored in said data storing means into a register which is specified by the register information stored in said register information storing means, at said write stage; and for stopping executing of an instruction word following an instruction word of said external access type until the instruction word of said external access type finishes external accessing, when said comparing means detects a coincidence before external accessing by an instruction word of said external access type is finished.

4. A data processor as set forth in claim 3, wherein said pipeline processing function includes:

a fetch stage as a first stage where the instruction word is fetched;

a decode stage as a second stage where the fetched instruction word is decoded;

an execution stage as a third stage where an operation specified according to the decode result by said decode stage is executed; and a write stage as a fourth stage where the operation result obtained in said execution stage is written into said register.

* * * * *